June 14, 1927. 1,632,038
A. E. NORRIS
MECHANICAL MOVEMENT
Filed July 31, 1923
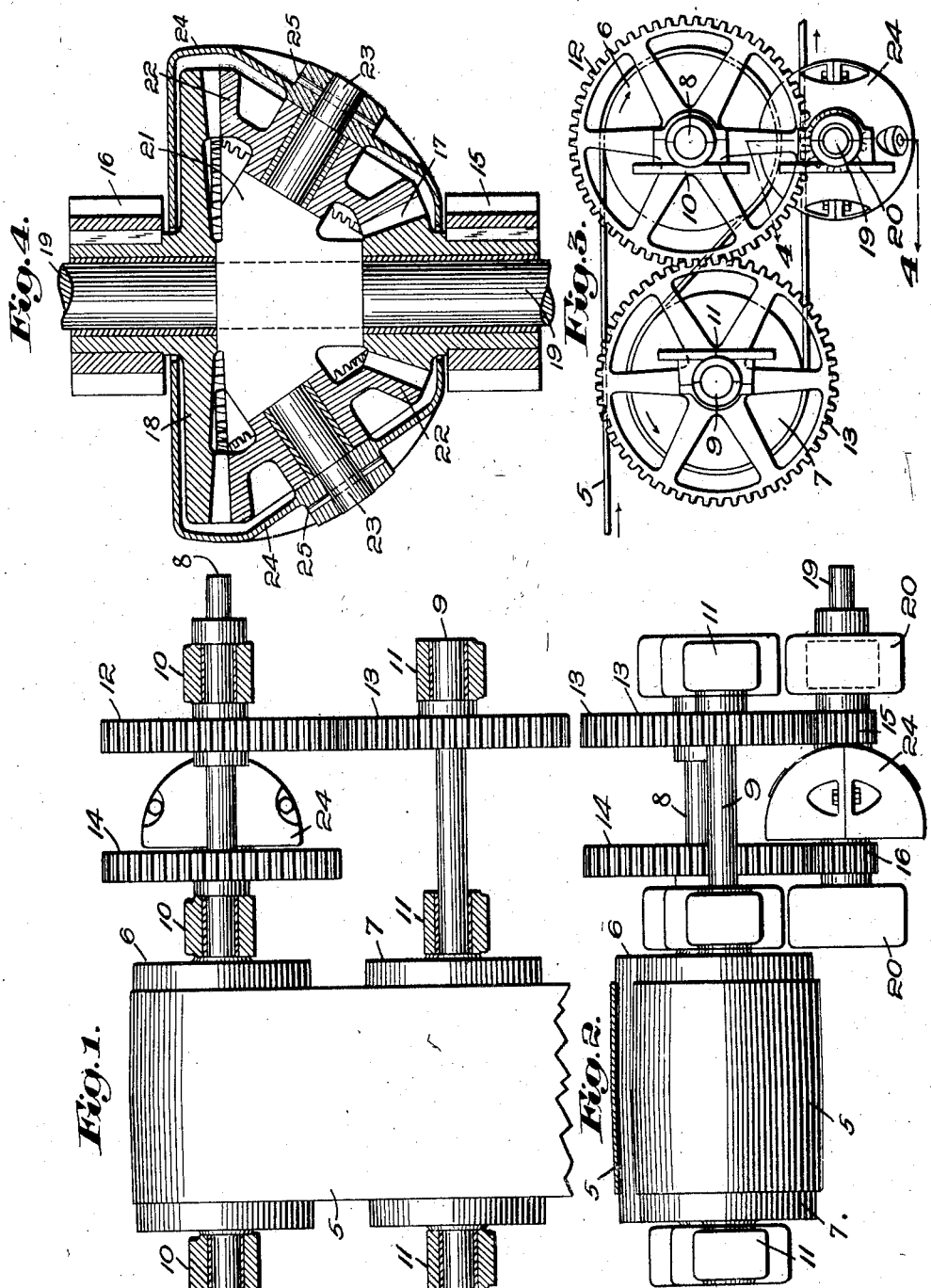
Inventor:
Almon E. Norris,
by Emery, Booth, Janney & Varney, Attys.

Patented June 14, 1927.

1,632,038

UNITED STATES PATENT OFFICE.

ALMON E. NORRIS, OF BROOKLINE, MASSACHUSETTS.

MECHANICAL MOVEMENT.

Application filed July 31, 1923. Serial No. 654,891.

This invention aims to provide a novel and improved power transmitting mechanism, one of its uses being for the transmission of power to a belt or rope by the frictional engagement therewith of two pulleys to which the power is supplied through the intervention of said power transmitting mechanism including distributing means which apportions the power in such a manner as to obtain the most effective driving force with the least radial thrust on the bearings, the least stress in the belt for a given effective pull, and the least outlay for equipment. The invention will be best understood by reference to the following description when taken in connection with the accompanying drawings of one specific embodiment thereof, while its scope will be more particularly pointed out in the appended claims.

In the drawings:

Fig. 1 is a plan of a power transmission mechanism exemplifying the invention;

Fig. 2 is an elevation of the power transmission mechanism;

Fig. 3 is an end elevation of the power transmission mechanism; and

Fig. 4 is a central horizontal sectional view on an enlarged scale on line 4—4 of Fig. 3, showing the mechanism for the distribution of power to the two pulleys.

Referring to the drawings and to the embodiment of the invention which is selected for exemplification, there is shown a portion of a band such as an endless belt 5 which passes over two pulleys 6 and 7 in succession, the arrangement of the pulleys being such as to obtain a very considerable wrap or arc of contact. The direction of travel of the belt is indicated by the several arrows in Fig. 3. The term "belt," as herein employed, is intended to comprehend any mechanical equivalent thereof such as a rope.

The pulleys are secured to shafts 8 and 9 respectively, which are mounted in appropriate bearings 10 and 11. Loosely mounted on the shaft 8 is a spur gear 12 which meshes with and drives a spur gear 13, secured to the shaft 9. Secured to the shaft 8 is a spur gear 14. The gears 12 and 14 mesh with and are driven by pinions 15 and 16 respectively (see Fig. 2). Interposed between and furnishing power to these pinions is a distributing mechanism whereby different tractive efforts are applied to the pulleys, the apportionment of the distribution of power to the pulleys being such that the one over which the belt passes first shall receive a greater percentage of the driving force than the other. This distributing mechanism will now be described, reference being had to Fig. 4.

Herein, the pinions 15 and 16 are axially aligned with each other and are keyed, one to a bevel pinion 17 and the other to a relatively larger bevel gear 18, both of which are loosely mounted on a shaft 19 which extends axially through the pinions 15 and 16 and is journalled in bearings 20. Secured to this shaft is a carrier 21 for one or more, herein two, bevel gears 22, which are mounted to turn loosely on studs 23 presented by the carrier. In the present example, these studs affords support for a casing 24 which is appropriately secured to the studs as by pins 25, said casing presenting a housing for the bevel gears.

Power is applied to the driving shaft 19 from any appripriate source. The distribution of power to the two pulleys is proportional to the ratios of the gears 17 and 18 and may be predetermined according to the particular conditions of the installation, one satisfactory apportionment being in the ratio of 2½ to 1. In operation, there is a continual creeping of the belt on the pulleys, and if the slipping action tends to vary from time to time, automatic correction is made by the balancing action of the gearing.

Having thus described one embodiment of my invention, but without limiting myself thereto, what I claim and desire by Letters Patent to secure is:—

1. In a power transmitting mechanism, the combination of a driving shaft, two driven shafts, and mechanism to cause said driving shaft to drive said driven shafts, said mechanism including two gears meshing with each other, one secured to one driven shaft and the other loosely mounted on the second driven shaft, a gear secured to the second driven shaft, pinions loosely mounted on said driving shaft and meshing, respectively, with the gears on the second driven shaft, gears of different diameters loosely mounted on said driving shaft and carrying said pinions, respectively, a carrier secured to said driving shaft, and a gear loosely mounted on said carrier to rotate about an axis other than the axis of said driving shaft, the last-mentioned gear meshing with said gears of different diameters.

2. In a power transmitting mechanism, the combination of a driving shaft, two driven shafts, and mechanism to cause said driving shaft to drive said driven shafts, said mechanism including two gears meshing with each other, one secured to one driven shaft and the other loosely mounted on the second driven shaft, a gear secured to the second driven shaft, pinions loosely mounted on said driving shaft and meshing, respectively, with the gears on the second driven shaft, and gearing connecting said driving shaft to said pinions and providing different ratios between said driving shaft and said pinions, respectvely.

3. In a power transmitting mechanism, the combination of a driving shaft, a carrier secured to said shaft, a gear loosely mounted on said carrier to rotate about an axis other than the axis of said driving shaft, gears of different diameters loosely mounted on said driving shaft and meshing with the first-mentioned gear, pinions loosely mounted on said driving shaft and carried by said loosely mounted gears, respectively, a driven shaft, gears meshing with said pinions, respectively, one of the last-mentioned gears being loosely mounted on said driven shaft and the other being secured to said driven shaft, a second driven shaft, and a gear secured to said second driven shaft and meshing with said gear which is loosely mounted on the first-mentioned driven shaft.

In testimony whereof, I have signed my name to this specification.

ALMON E. NORRIS.